US006238509B1

(12) United States Patent
Herlfterkamp et al.

(10) Patent No.: US 6,238,509 B1
(45) Date of Patent: May 29, 2001

(54) ADHESIVE SYSTEM FOR GLUING ALL-AROUND LABELS

(75) Inventors: Bernhard Herlfterkamp, Bottrop; Hermann Onusseit, Haan; Horst Buxhofer, Erkrath; Ludwig Broich, Duesseldorf; Ralf Grauel, Hilden; Jan Auris, Dormagen, all of (DE)

(73) Assignee: Henkel Kommanditgesellschaft auf Aktien, Dusseldorf (DE)

( * ) Notice: Subject to any disclaimer, the term of this patent is extended or adjusted under 35 U.S.C. 154(b) by 0 days.

(21) Appl. No.: 08/973,890

(22) PCT Filed: Jun. 12, 1996

(86) PCT No.: PCT/EP96/02548

§ 371 Date: Dec. 16, 1997

§ 102(e) Date: Dec. 16, 1997

(87) PCT Pub. No.: WO97/00298

PCT Pub. Date: Jan. 3, 1997

(30) Foreign Application Priority Data

Jun. 19, 1995 (DE) .............................. 195 21 564

(51) Int. Cl.$^7$ ....................................... B65C 3/08
(52) U.S. Cl. ................. 156/314; 156/215; 156/248; 156/306.3; 156/328; 156/331.6; 156/331.7; 156/336; 156/DIG. 9
(58) Field of Search ................... 156/326, 446, 156/448, 86, 456, 306.3, 308.8, 390, 314, DIG. 9, DIG. 11, DIG. 13, DIG. 32, DIG. 35, DIG. 50, 248, 215, 328, 336, 331.6, 331.7

(56) References Cited

U.S. PATENT DOCUMENTS

| 4,462,838 | | 7/1984 | Andres et al. .................. 106/139 |
| 4,464,202 | * | 8/1984 | Andres et al. . |
| 4,574,020 | * | 3/1986 | Fosnaught ........................... 156/80 |
| 4,595,737 | * | 6/1986 | Straub et al. . |
| 4,735,668 | * | 4/1988 | Hoffmann et al. . |
| 5,091,239 | | 2/1992 | Przeworski et al. ............ 428/195 |
| 5,275,678 | * | 1/1994 | West et al. .................. 156/568 X |
| 5,286,333 | * | 2/1994 | Orlandi . |
| 5,321,933 | * | 6/1994 | Seifert et al. . |
| 5,441,562 | | 8/1995 | Broich et al. .................... 106/144 |
| 5,985,074 | * | 11/1999 | Heemann et al. . |

FOREIGN PATENT DOCUMENTS

| 38 31 760 | 6/1989 | (DE) . |
| 0 610 005 | 8/1994 | (EP) . |
| 05 173 487 | 7/1993 | (JP) . |
| 05 230 427 | 9/1993 | (JP) . |
| WO93 03111 | 2/1993 | (WO) . |

OTHER PUBLICATIONS

Irving Skeist, Handbook of Adhesives, Chapman & Hall, pp. 141–142, 144–145, 1990.*

* cited by examiner

Primary Examiner—Curtis Mayes
(74) Attorney, Agent, or Firm—Wayne C. Jaeschke; Stephen D. Harper; Daniel S. Ortiz

(57) ABSTRACT

The invention relates to an adhesive system for labeling containers, more especially hollow containers, with wrap-around labels. The adhesive system comprises a pick-up adhesive and an overlap adhesive. It is characterized in that, in the wet state, the pick-up adhesive has sufficient wet bond strength for labeling and, in the dried state, does not adhere to at least one of the substrates. The pickup adhesive contains 5 to 85% by weight and preferably 5 to 60% by weight of at least one water-soluble polymer based on casein, starch, dextrin, glucose, polyvinyl alcohol, polyurethane or polyacrylic acid, 0.00 to 1.00% by weight and preferably 0.01 to 0.30% by weight of at least one defoamer, 0.00 to 1.00% by weight and preferably 0.01 to 0.30% by weight of at least one preservative and water as the balance to 100% by weight.

10 Claims, No Drawings

ADHESIVE SYSTEM FOR GLUING ALL-AROUND LABELS

BACKGROUND OF THE INVENTION

This invention relates to an adhesive system for applying wrap-around labels comprising a pick-up adhesive and an overlap adhesive, to a process for applying wrap-around labels, more particularly to hollow containers, using this adhesive system, to a process for removing the wrap-around labels thus applied from the hollow containers and, finally, to the use of the adhesive system for labeling recyclable or reusable hollow containers.

In the wrap-around labeling of hollow containers of glass, metal and plastics, hotmelt adhesives are at present the only adhesives used for the pick-up stage of the labeling process, i.e. for the initial application of the label to the hollow containers to be labeled. The excellent bond between the wrap-around label and the hollow container is a disadvantage so far as the removal of the wrap-around labels is concerned, for example in cases where the hollow containers are to be reused or recycled.

The reason for this is that the labels are difficult or impossible to remove from the hollow containers without tearing. The remaining parts of the label make subsequent cleaning difficult.

Accordingly, the problem addressed by the present invention was to apply wrap-around labels to such hollow containers as, for example, bottles, cans etc. in such a way that they could be easily and completely removed before cleaning. However, neither the labeling process itself nor the handling of the labeled containers would be adversely affected in any way. More particularly, labeling would be possible in high-performance machines (10 labels applied per second).

DETAILED DESCRIPTION OF THE INVENTION

The solution provided by the invention is defined in the claims. It lies essentially in the use of a water-based adhesive known per se instead of a hotmelt adhesive as the pick-up adhesive. Accordingly, if one of the surfaces of the container or label (substrate surfaces) is selected in such a way that the dried pick-up adhesive does not adhere thereto, the label can be completely removed. A suitable substrate surface generally consists of plastic.

Accordingly, the solution provided by the invention lies in an adhesive system for applying wrap-around labels comprising a pick-up adhesive and an overlap adhesive, characterized in that the pick-up adhesive is water-based and, in its wet state, has sufficient wet bond strength for labeling and, in its dried state, shows virtually no adhesion to at least one of the substrates.

The overlap adhesive may be selected from any of the adhesives hitherto used as overlap adhesives, more especially hotmelt adhesives. In the case of plastic containers, the overlap adhesive may also be based on water and may even be identical with the pick-up adhesive.

In the context of the invention, the "wet state" is understood to be the state immediately after application either to the label or to the container to be labeled.

The expression "sufficient wet bond strength for labeling" means that the bond strength of the adhesive is so high that the label does not slip under the prevailing process conditions without any need for additional fixing. Since the process conditions vary from machine to machine, the necessary wet bond strength is also different A bond strength of 0.05 to 0.03 N/mm$^2$ is mentioned as a guide.

The expression "in the dried state" means that the adhesive is in equilibrium with the normal surrounding atmosphere (approximately—20° C./50% relative humidity).

The expression "shows virtually no adhesion" means that the adhesion forces are so weak that the label does not tear during its removal and preferably drops downwards under its own weight after being cut through. The adhesive force of the dried pick-up adhesive does of course also depend upon the substrate. The substrates preferably used have surfaces that are difficult to bond and advantageously consist of plastics, for example PE, PP and PET.

The water-based pick-up adhesive according to the invention is a known glue, i.e. an adhesive which consists of water-soluble animal and vegetable and also synthetic polymers and water as solvent or even dispersant The adhesive advantageously contains 5 to 85% by weight and preferably 5 to 60% by weight of at least one water-dissolvable polymer based on casein, starch, dextrin, glucose, polyvinyl alcohol, polyurethane or polyacrylic acid, 0.00 to 1.00% by weight and preferably 0.01 to 0.30% by weight of at least one defoamer, 0.00 to 1.00% by weight and preferably 0.01 to 0.30% by weight of at least one preservative and water as the balance to 100% by weight.

"Water-dissolvable" means that the polymers mentioned can be dissolved or dispersed at the application temperature to such an extent that they apply the minimum adhesive force.

Defoamers, defoaming agents or foam inhibitors in the context of the invention are substances which are added to foaming liquids to reduce their foaming or to prevent them from foaming. They are either interfacially active substances which displace the foam generators from the interface without themselves producing any foam or products which increase the surface tension of water, for example natural fats and oils or fatty alcohols. The use of the defoamers is not absolutely essential, but is nevertheless helpful. For example, long-chain soaps, such as sodium behenate, may be used as the defoamer. Other suitable defoamers are those based on silicone, such as polyethylene/propylene glycol ethers which are known commercially as Pluronics®, and the corresponding mixed ethers of these compounds.

The substances used as preservatives in accordance with the present invention are always used when the corresponding polymers, for example the natural polymers, are likely to be exposed to microbially induced changes. Corresponding preservatives are well known to the expert and often include heavy metal salts, such as tin and mercury compounds, and also halogen, sulfur, ammonium compounds and the like.

In one preferred embodiment of the present invention, 0 to 75 parts by weight and preferably 1 to 50 parts by weight per 100 parts by weight of the adhesive of at least one filler in the form of water-soluble salts are also added to the labeling adhesive. The primary function of these fillers is to reduce the water content of the adhesive. Accordingly, water-soluble to readily water-soluble inorganic and organic salts, such as sodium nitrate, sodium chloride, sodium sulfate, etc., are particularly suitable for this purpose.

In another preferred embodiment of the invention, 0 to 75 parts by weight and preferably 1 to 50 parts by weight per 100 parts by weight of the adhesive of at least one balsam and/or tall oil resin reacted with alkalis are also added to the labeling adhesive. Balsam resins in the context of the invention are solutions of solid resin constituents, such as resin alcohols, resin esters, resin acids, high molecular weight hydrocarbons, etc., in essential oils, for example turpentine oil. These viscous balsams gradually harden in air because the volatile oil evaporates and leaves behind often clear, glass-like amorphous masses which are known as balsam resin or even as colophony. Known balsam resins are, for example, Canada balsam, copaiba balsam, Peru balsam, Styrax, turpentine, Tolu balsam, etc. Tall oil resins in the context of the present invention are mainly understood to be compounds derived from the pine which consist essentially of around 30 to 43% of abietic acid, 21 to 35% of dihydroabietic acid, 8 to 12% of palustric acid and 2 to 7% of dihydroabietic acid, neoabietic acid, pimaric and isopimaric acid in addition to 8 to 18% of other resin acids.

In another preferred embodiment of the invention, the water-soluble polymer is treated by exposure to mechanical forces and/or by chemical degradation. The mechanical treatment, for example, is carried out by stirring the highly viscous polymer solution for several hours while the chemical degradation is carried out with agents typically used for this purpose, for example oxidizing agents based on hydrogen peroxide. The viscosity of the solution is reduced in this way.

The pick-up adhesives produced by the process described above have a Brookfield RVT viscosity at 25° C. of 1,000 mPas to 500,000 mPas and a viscosity at an application temperature of 25 to 35° C. in the range from 25,000 mPas to 200,000 mPas. These adhesives are preferably applied at temperatures similar to room temperature, i.e. at temperatures in the range from 15 to about 35° C. Although, in principle, the pick-up adhesives could be applied at higher temperatures, this is less preferred for machinery reasons.

The containers to be labeled in accordance with the present invention are, in particular, hollow containers, such as bottles, cans, drums, tubes or cartridges, which are essentially based on optionally plated or electroplated metal, for example tin plate or aluminium, glass, ceramics or thermoplastics, such as polyethylene terephthalate, polycarbonate, polyethylene, polypropylene, polyvinyl chloride or polystyrene.

The labels consist on the hand of thermoplastics, such as polyethylene, polypropylene, polystyrene, polyvinyl chloride, oriented polypropylene or cellophane. If the labels are to be applied to plastic bottles, suitably hydrophobicized papers, for example silicone-treated or lacquered papers, may also be used.

The present invention also relates to a process for applying wrap-around labels optionally containing perforated strips to containers, more especially hollow containers, using the adhesive system according to the invention, the process according to the invention comprising the following steps:

a) application of the adhesive to at least part of the surface of the container to be labeled or to at least part of the back of the wrap-around label, b) application of the wrap-around label and joining of the back of one end to the front of the other end with the overlap adhesive and c) allowing the wrap-around label to set.

The present invention also relates to a process for removing the wrap-around labels applied in accordance with the invention from hollow containers, characterized in that, after it has been cut through, the wrap-around label is removed from the hollow container by light mechanical force. This is preferably done by removing the wrap-around label from the hollow container by light mechanical force after it has been cut through, optionally along the perforated strip, but especially by applying compressed air or water pressure as the mechanical force.

Finally, the present invention relates to the use of the labeling adhesive for labeling reusable or recyclable containers to be provided with wrap-around labels, more especially hollow containers, such as bottles, cans, drums, tubes and cartridges of glass, metal and plastic.

The above-mentioned use and delabeling may be applied both to hollow containers for foods and to corresponding hollow containers in the cosmetics and pharmaceutical industries, but especially to corresponding aerosol containing hollow containers. The preferred field of application is the beverage industry.

The present invention is illustrated by the following Production Examples 1–6 and Application Example 7.

EXAMPLES

Example 1

400 g of a water-soluble starch, namely the Emsland carboxymethyl starch Emsize CMS 60, were added to and dissolved by stirring in 600 g of water. 0.2% of a commercial defoamer, namely the product Syperonic PEL 121 (a Pluronic compound, i.e. a polyethylene/polyglycol ether) and 0.2% of the preservative Mergal KM 90 (a benzisothiazolinone) were then added. The adhesive is basically suitable as such for solving the above-stated problem of wrap-around labeling with subsequent further processability. The setting time is still extremely long, but practicable.

Example 2

400 g of the water-soluble starch of Example 1 were added to 400 g of water. At the same time, 200 g of sodium chloride were added, both the starch and the sodium chloride being dissolved by stirring. A commercial defoamer and preservative were then added in quantities of 0.2%, as in Example 1. The setting time is considerably shortened in relation to the product of Example 1. Accordingly, the product is also suitable for substrates of which neither is readily permeable to water, for example wrap-around plastic labels on bottles of thermoplastic.

Example 3

300 g of starch (Emsize CRS 60) were dissolved in 400 g of water. 300 g of a balsam resin reacted with sodium hydroxide were then added. Defoamer and preservative were then added in quantities of 0.2% as in Example 1. The adhesive again had a short setting time and is therefore particularly suitable for wrap-around plastic labels on bottles of thermoplastic.

Example 4

400 g of starch (Emsize CMS 60) were dissolved in 300 g of water at 80° C. and the resulting solution was stirred for several hours with cooling and intensive mechanical shearing until it had a Brookfield RVT viscosity at 25° C. of 50,000 to 150,000 mPas. The adhesive is also suitable for the above-mentioned application. If desired, a filler may also be added in the form of an organic or inorganic salt which further reduces the setting time.

Example 5

400 g of Emsize CMS 60 are dissolved in 300 g of water at 80° C. 35% hydrogen peroxide was then added with stiming. The viscosity of the solution decreased to different extents over a period of about 5 to 30 minutes, depending on the quantity of hydrogen peroxide added. In this case, too, a filler may be added in the form of an organic or inorganic salt, as described in Example 2. This product is also particularly suitable for the wrap-around labeling of substrates which are not readily permeable to water, for example plastic films or labels on bottles of thermoplastic.

Example 6

200 g of casein were added to 500 g of water and a pH value of 7.5 to 8.5 was adjusted with sodium hydroxide so that the casein dissolved. 0.3% of a defoamer and 0.3% of a preservative were added as in Production Example 1. A filler in the form of a water-soluble salt was also added as described above. All the components were homogeneously mixed. A quick-setting adhesive is obtained in this way and is particularly suitable for plastic wrap-around labels on bottles of thermoplastics.

Example 7

The adhesive obtained in Production Example 1 was applied as pick-up adhesive in a quantity of 0.2 g to a plastic label of oriented polypropylene in a processing machine and the label was applied to a plastic bottle of polyethylene terephthalate. After about 4 weeks, the label was completely dry. It was then easy to remove from the bottle without tearing into several pieces.

What is claimed is:

1. A process for applying wrap-round labels, optionally containing perforated strips, to containers with an adhesive system, comprising a water-based pick-up adhesive wherein, in a wet state, the pick-up adhesive has sufficient bond strength for labeling, and wherein, in a dried state, the pick-up adhesive shows virtually no adhesion to at least one of a container substrate a label substrate or both, and an overlap adhesive which bonds overlapping ends of the label, the pick-up adhesive comprising
    (a) about 5% to about 85% by weight of water soluble substance selected from the group consisting of casein, starch, dextrin, glucose, polyvinyl alcohol, polyurethane, polyacylic acid and mixtures thereof;
    (b) 0 to about 1% by weight of at least one defoamer;
    (c) 0 to about 1% by weight of at least one preservative: and
    (d) water as the balance to 100% by weight, the process comprising:
        (1) applying the pickup adhesive to at least part of a surface of the containers to be labeled or to at least part of a back of the wraparound label;
        (2) applying the wrap-around label;
        (3) joining a back of a first end of the wrap-around label to a front of a second end of the wrap-around label with the overlap adhesive; and
        (4) allowing the adhesive to set.

2. A process for removing wrap-around labels applied by the process claimed in claim 1 from a container, comprising the steps of:
    cutting through said wrap-around label; and
    removing said wrap-around label from the container by light mechanical force.

3. The process as claimed in claim 2, wherein, the mechanical force is applied in the form of compressed air or water under pressure.

4. In a process for labeling recyclable or reusable containers with wrap-around labels, wherein the improvement comprises; labeling the containers with an adhesive system comprising: a water-red pick-up adhesive, wherein, in a wet state, the pick-up adhesive has sufficient bond strength for labeling, and wherein, in a dried state, the pick-up adhesive shows virtually no adhesion to at least one of a substrate, a label substrate or both, and an overlap adhesive which bonds overlapping ends of the label; the pick-up adhesive comprising:
    (a) about 5% to about 85% by weight of a water soluble substance selected from the group consisting of casein, starch, dextrin, glucose, polyvinyl alcohol, polyurethane, polyacylic acid and mixtures thereof;
    (b) 0 to about 1% by weight of a least one defoamer;
    (c) 0 to about 1% by weight of a least one preservative; and
    (d) water as the balance to 100% by weight.

5. The improved process of claim 4, wherein said containers comprise a member selected from the group consisting of cans, drums, tubes, cartridges and bottles.

6. The improved process of claim 4, wherein the container substrates to be labeled are selected from the group consisting of optionally plated metal, glass, ceramic or thermoplastics.

7. The improved process of claim 6, wherein the optionally plated metal comprises tin plated metal.

8. The improved process of claim 6, wherein the metal comprises aluminium.

9. The improved process of claim 6, wherein the thermoplastic comprises a member selected from the group consisting of polyethylene terephthalate, polyvinyl chloride, polypropylene, polyethylene, polycarbonate, polystyrene and mixtures thereof.

10. The improved process of claim 6, wherein the wrap-around labels are selected from the group consisting of paper, thermoplastic and mixtures thereof.

* * * * *